Patented Oct. 16, 1923.

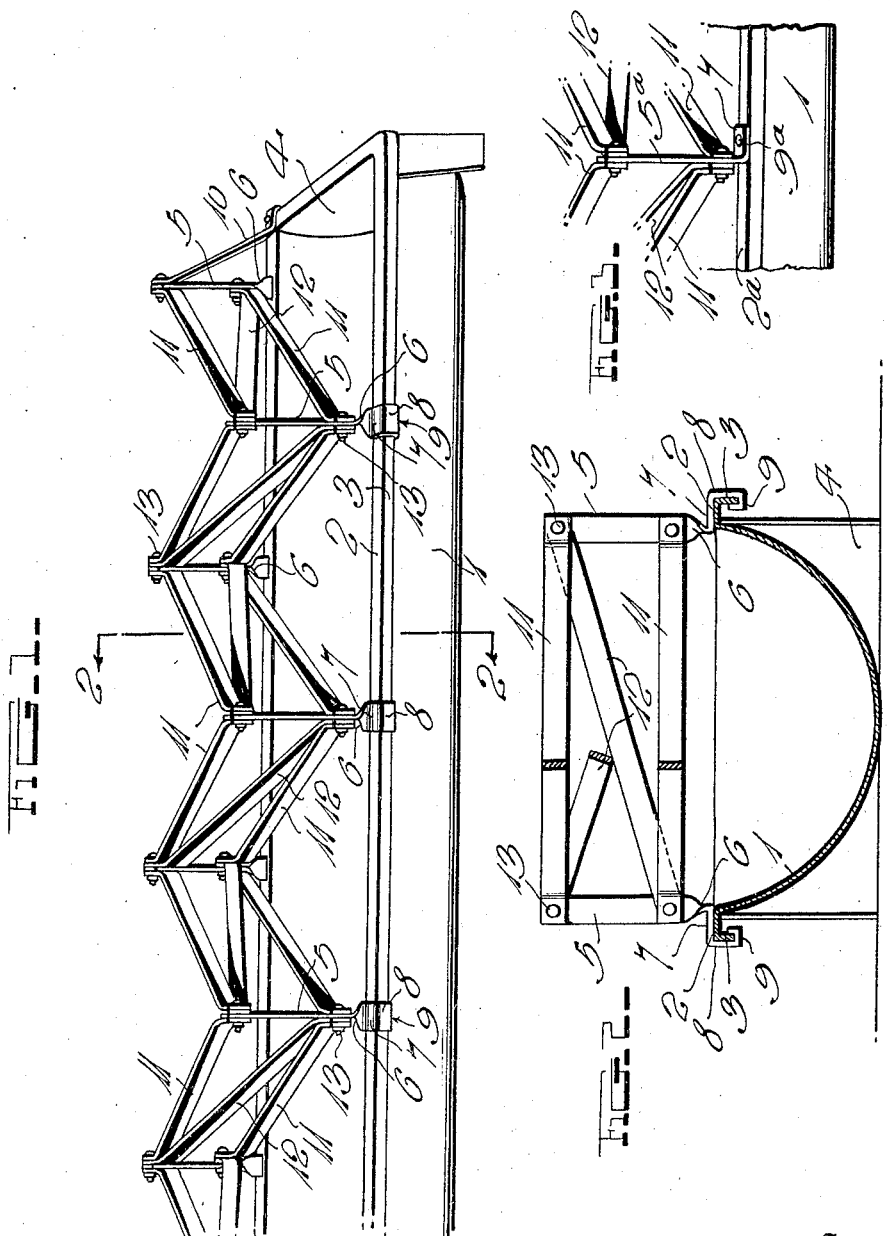

1,470,629

UNITED STATES PATENT OFFICE.

WILLIAM T. LAWHEAD, OF CAINESVILLE, MISSOURI.

HOG-TROUGH GUARD.

Application filed December 19, 1921. Serial No. 523,382.

*To all whom it may concern:*

Be it known that I, WILLIAM T. LAWHEAD, a citizen of the United States, residing at Cainesville, in the county of Harrison and State of Missouri, have invented certain new and useful Improvements in Hog-Trough Guards; and I do declare the following to be a full, clear, and exact description of the invention, such as will enable others skilled in the art to which it appertains to make and use the same.

My invention relates to improvements in guards adapted for attachment to hog troughs for the purpose of preventing the hogs from crowding each other and walking along the trough. I am aware that numerous devices have been provided for this purpose, employing a zig-zag wall of some form extending along the trough so as to form alternate head stalls for the swine, but one aim of my invention is to greatly simplify and cheapen devices of this character, without sacrificing any advantages.

A still further object of the invention is to provide novel means for attaching the guard to the trough.

With the foregoing in view, the invention resides in the novel subject matter hereinafter described and claimed, the descriptive matter being supplemented by the accompanying drawing.

Figure 1 is a perspective view of a hog trough equipped with my invention.

Figure 2 is a vertical transverse sectional view as indicated by line 2—2 of Fig. 1.

Figure 3 is a detail perspective view showing a different manner of attaching the guard to the trough.

In the form of construction shown in Figs. 1 and 2, I have illustrated my invention in connection with a hog trough 1 whose opposite sides are provided with flanges extending horizontally outward as at 2 and then projecting downwardly as shown at 3, the ends of the trough being closed by appropriate end plates 4. Extending along opposite sides of the trough, are two rows of vertical standards 5 which are preferably formed of strap iron, the standards of one row being staggered with respect to those of the other row as illustrated clearly in Fig. 1. For attaching these standards to the trough, I give their lower ends a quarter twist as indicated at 6 and bend them outwardly to form horizontal feet 7 adapted to rest on the flange portions 2, the outer ends of said feet being bent downwardly as shown at 8 and being then bent inwardly and upwardly to form hooks 9 engaging the lower edges of the vertically extending flange portions 3. The standards when constructed in this manner may be slid onto the trough from one end and may be secured in place by any preferred means, such as inclined braces, one of which is shown at 10 in Fig. 1. One end of each of these braces is secured to the adjacent end plate 4, in any suitable manner, and the other end of the brace is secured to the standard 5 at one end of the guard.

In the form of construction shown in Fig. 3, I have shown a standard $5^a$ whose lower end is bent laterally to form a foot $7^a$ resting on a flange $2^a$ with which the trough is provided, said foot being secured to the trough flange by means of a bolt or rivet $9^a$. Extending obliquely from the standards of one row, that is the standards at one side of the trough, to those of the other row at the opposite side of said trough, are upper and lower horizontal bars 11, while also connecting the standards of the two rows, are a plurality of inclined brace bars 12, said brace bars being located in common planes with the horizontal bars 11 to form therewith a plurality of oblique barriers or walls extending across the trough, each pair of walls serving to form a head stall for one hog. Bolts or rivets 13 are used to secure the bars 11 and 12 to the standards 5 and $5^a$ and it will be seen that each of these bolts preferably secures one end of a brace bar 12 and the adjacent ends of two of the bars 11, in place, thereby economizing in manufacture.

The several parts 5, $5^a$, 11 and 12 are all preferably formed of strap iron so that the entire device may be easily and inexpensively manufactured and marketed. Nevertheless, it will be extremely rigid and particular emphasis is laid upon the brace bars 12 which serve not only to impart the necessary rigidity to the guard but also co-act with the horizontal bars 11 in forming barriers between the several stalls. By the use of the invention, not only are the hogs prevented from crowding each other but they cannot walk along the length of the trough as they are prone to do.

Since excellent results may be obtained from the details disclosed, they are preferably followed but within the scope of the invention as claimed, numerous minor changes may be made.

I claim:

1. The combination with a hog trough having flanges along its sides extending outwardly and then downwardly, of a guard provided with standards having outwardly extending feet resting on the outwardly extending portions of said flanges, the outer ends of said feet being extended downwardly and provided with hooks receiving the lower edges of the downwardly projecting portions of said flanges.

2. A hog trough guard comprising two rows of standards having outwardly extending feet at their lower ends, the outer ends of said feet being extended downwardly and inwardly and formed with upwardly opening hooks, said feet and hooks being adapted for co-action with flanges on a hog trough to secure the guard in place.

In testimony whereof I have hereunto set my hand.

WILLIAM T. LAWHEAD.